T. A. EDISON.
Circuits for Automatic or Chemical Telegraphs.
No. 141,772. Patented August 12, 1873.
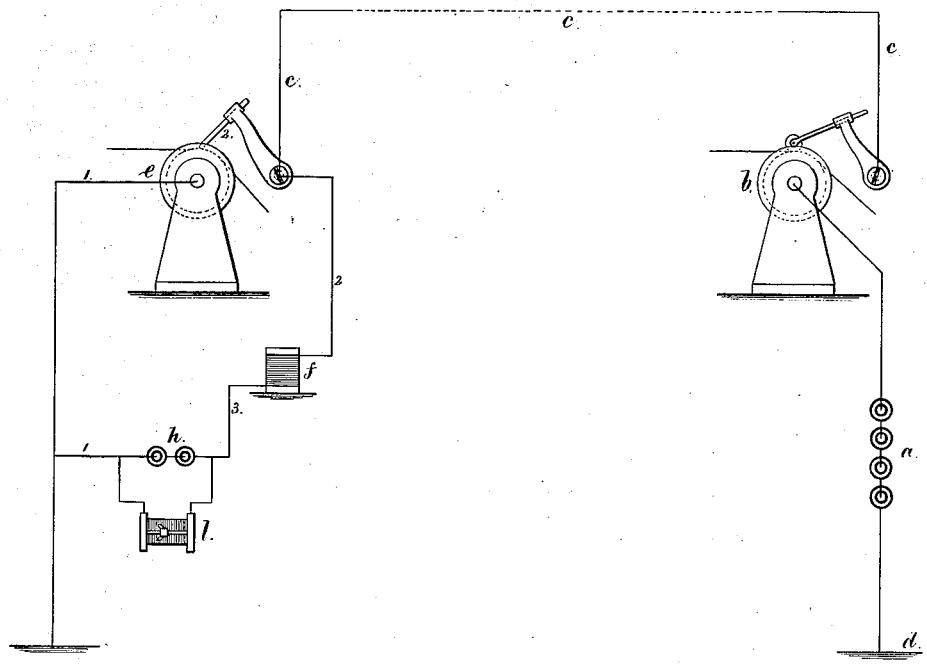
Witnesses,
Inventor
Thomas A. Edison,

UNITED STATES PATENT OFFICE.

THOMAS A. EDISON, OF NEWARK, NEW JERSEY.

IMPROVEMENT IN CIRCUITS FOR AUTOMATIC OR CHEMICAL TELEGRAPHS.

Specification forming part of Letters Patent No. 141,772, dated August 12, 1873; application filed November 9, 1872.

*To all whom it may concern:*

Be it known that I, THOMAS A. EDISON, of Newark, in the county of Essex and State of New Jersey, have invented an Improvement in Telegraphic Circuits, of which the following is a specification:

In chemical telegraphs it often happens that the pulsations of electricity that reach the paper are too powerful; and hence there is an elongation or attenuation of the mark upon the paper, causing the characters to be indistinct or to run into each other.

The present invention is to prevent this difficulty by regulating the quantity of the current passing to the chemical paper, and then bringing in an adjustable reverse current to neutralize any tailings.

In the annexed diagram the peculiarity of arrangement of circuits and instruments is illustrated.

A battery, $a$, is connected through the transmitting instrument $b$ to the line-wire $c$, and the earth connection $d$ is of the usual character. At the receiving-station the instrument $e$ is to be of ordinary character for presenting the chemical paper to the action of the stylus and current. Rheostats have been used between the main-line and receiving instrument, and also in a shunt or branch circuit connected with the earth, and a battery has been placed in the shunt or branch circuit. I employ a rheostat, $f$, in a shunt connection between the parts of the main line, through which a portion of the electric pulsation passes, the rheostat being sufficient to counteract the resistance of the chemical paper, and cause the proper proportion of current to pass through said paper. The battery $h$ is placed in the main or branch line with its poles in a position to cause the electricity to circulate through the local circuit composed of 1, $e$, 2, $f$, and 3, in a direction opposite to that in the main line, so that any attenuation of the mark may be prevented by the reverse action of the currents. If the before-mentioned parts only were employed, the local battery $h$ might be sufficient to neutralize the electric pulsations in the main line. I therefore introduce a rheostat, $l$, between the poles of the battery $h$, and the same should be variable or adjustable to allow the action of the battery $h$ to be varied, and only so much of the reverse current directed through the local circuit and the chemical paper as will prevent the attenuation or tailing of the mark upon the chemical paper, leaving that mark clear and distinct.

I claim as my invention—

The rheostat $l$ applied to the battery $h$ in the local circuit to regulate the action thereof, in combination with the rheostat $f$ in the branch circuit, and the receiving instrument in the main circuit, substantially as and for the purposes set forth.

Signed by me this 5th day of November, A. D. 1872.

THOMAS A. EDISON.

Witnesses:
GEO. T. PINCKNEY,
CHAS. H. SMITH.